United States Patent [19]

Guest

[11] 4,178,023
[45] Dec. 11, 1979

[54] COUPLINGS FOR TUBES

[76] Inventor: John D. Guest, "Iona", Cannon Hill Way, Bray, Maidenhead, Berkshire, England

[21] Appl. No.: 875,713

[22] Filed: Feb. 6, 1978

[30] Foreign Application Priority Data

Feb. 9, 1977 [GB] United Kingdom ............ 5415/77
Jul. 26, 1977 [GB] United Kingdom .......... 31398/77

[51] Int. Cl.² ........................................ F16L 17/00
[52] U.S. Cl. ................................. 285/323; 285/105; 285/340
[58] Field of Search ............ 285/323, 322, 340, 105, 285/113, 104, 382.7, 421

[56] References Cited

U.S. PATENT DOCUMENTS

| 3,384,392 | 5/1968 | Gilchrist | 285/105 |
| 3,653,689 | 4/1972 | Sapy et al. | 285/322 X |
| 3,743,326 | 7/1973 | Courtot et al. | 285/323 |
| 4,005,883 | 2/1977 | Guest | 285/322 |

FOREIGN PATENT DOCUMENTS 237391 12/1964 Austria ....................... 285/105

Primary Examiner—Thomas F. Callaghan
Attorney, Agent, or Firm—Beveridge, DeGrandi, Kline & Lunsford

[57] ABSTRACT

A tube coupling, of the kind having a collet in a bore in a body member, the collet arms having cam surfaces co-operating with an internal surface on the bore so that the collet arms are forced radially inwardly to grip a tube in the collet if the latter is pulled in a direction outwardly of the bore, has the collet moulded of plastics material. Projections intermediate the ends of each collet arm are provided to grip the tube and the arms are shaped so that their portions inwardly of the bore beyond the projections also bear against the tube, thereby spreading the gripping force along part of the length of the tube and so preventing the tube from deforming and pulling out even if the tube is of resilient material.

15 Claims, 5 Drawing Figures

COUPLINGS FOR TUBES

BACKGROUND OF THE INVENTION

1. Field of the Invention

This invention relates to couplings for tubes and is concerned more particularly with a tube coupling of the kind having a body member containing a collet for gripping the tube.

2. Prior Art

The body member may be a device to which the tube is to be coupled or it may contain two collets for holding the ends of separate tubes which are to be connected together. It is known to have a collet with resilient arms, the arms being forced inwardly by axial movement of the collet, the arms for this purpose having an outer tapered surface co-operating with a cam surface on said body member surrounding the collet. This cam surface may be an internal surface on the body member tapering in one axial direction and engaging the arms of the collet, the surfaces being such that the arms are forced inwardly by axial movement of the collet in the direction of withdrawal of the tube from the coupling. If a tube is pushed into the coupling through the collet from the end thereof remote from the arms so as to be gripped by the collet, any pull on the tube tends to pull the collet out and, by engagement with the tapering surface on the surrounding member, the arms of the collet are forced inwardly to grip the tube more firmly. The tube can be released however by holding the collet axially inwardly of said member so ensuring that the arms are not moved radially inwardly; the tube can then be withdrawn by overcoming any frictional or resilient grip between the arms and the tube.

As is described in my earlier U.S. Pat. No. 4,005,883, such a tube coupling can be constructed with a body member having an internal surface which tapers to a narrower diameter towards one end of the body member and the collet can be inserted through this narrow diameter portion of the body member by arranging the arms such that they can, in the absence of any tube within the collet, be forced sufficiently far inwardly to permit the arms passing through this narrow diameter portion.

SUMMARY OF THE INVENTION

According to the present invention, there is provided a tube coupling of the kind having a body member with a bore containing a collet with resilient arms, cam surfaces on said arms being arranged to co-operate with an internal surface of said body member, and said internal surface tapering to a narrower diameter in a direction towards an open end of a bore in said body member whereby an outward pull on the collet forces the arms together, wherein the collet arms have an inwardly extending projection or projections at a position along the length of the arms intermediate the ends thereof to engage and grip a tube in the collet, the arms extending beyond the projection or projections so that the outer ends of the arms beyond the projection or projections bear against the tube when the arms are forced inwardly by engagement of said co-operating surfaces.

Preferably said cam surfaces on the collet arms extend only part of the way along the length thereof such that co-operating tapered surface on the body member engages only a part of the length of said arms at or near the root end thereof, that is the end where the arms join together. The arms bend about their root end and it is convenient to refer to this end of each arm as its fulcrum. The collet and collet arms preferably define a substantially cylindrical internal surface apart from the aforementioned inwardly-extending projection or projections.

With this construction, the collet may be assembled in the aforementioned body member by forcing the arms radially inwardly and inserting the collet through the open end of the bore. To couple a tube to said body member, the tube is inserted into said bore through the collet in the open end of the bore, the coupling and tube being made of appropriate diameters so that the tube is at least lightly gripped by gripping means on the resilient collet arms. If the tube is now pulled outwardly, the tapered surfaces on the collet arms engage the tapered surface in the bore to force the collet arms inwardly. These arms will each flex about its fulcrum. The arms will be forced inwardly and they are sufficiently flexible such that, if one considered the length of the arms between their fulcrums and their points of maximum radial diameter, they could deflect so that the collet could be withdrawn outwardly from the body member. In the tube coupling of the present invention, these collet arms extend beyond the region of the co-operating surfaces. In other words the arms extend in the axial direction beyond the outer end of said cam surfaces on said arms. The portions of the collet arms beyond the region where the inward pressure is applied to the arms will be moved radially inwardly and will bear against the tube surface so increasing the area of the tube on which the collet arms are pressed. Excessive radial inwardly deflection of the ends of the collet arms remote from their fulcrums is prevented. Heretofore in tube couplings of this type, the practice has been to make the point of maximum diameter of the collet arms at or near the ends of these arms remote from their fulcrums. By the arrangement of the present invention it is possible to apply a much greater inward pressure on the arms since this is distributed over the tube surface and it becomes possible to withstand very much greater withdrawal loads on a tube even if the tube is of resilient material and relatively easily deformable than has heretofore been the case. This is of particular advantage if the tube is not internally supported by the presence of a pressure fluid.

The spacing of the arms and the lengths of the slots between the arms of the collet are preferably such that, in the absence of any tube within the collet, the collet can be withdrawn through the open end of the bore. The arms of the collet, beyond said projection or projections, are preferably of substantially uniform thickness in the radial direction. The radially inner and radially outer surfaces of the arms, beyond said projection or projections, are preferably on substantially cylindrical surfaces when the arms are unstressed.

The invention finds particular application to a construction in which the collets are moulded of a plastics, for example an acetal material. Heretofore it has been the general practice to make such collets of metal and, in order to get sufficient inward deflection of the arms to give a good grip on the tube, gripping means have to be at the far end of the arms remote from the fulcrum; the angular deflection of the arms is limited and for this reason, the co-operating cam surfaces have usually extended substantially along the full length of the arms or have been located adjacent the ends of the arms where the maximum deflection is to be obtained. With a plastics material, because of the much more resilient nature of the material, the required bending of the arms can readily be obtained over a relatively short length. The present invention enables advantage to be taken of the deflection over a short length whilst enabling very much greater resistance to withdrawal of the tube to be obtained.

Preferably the aforementioned gripping means comprises a projection or beak in the form of an annular rib extending around the periphery of the collet on the internal surface thereof, the side surfaces of the rib meeting at an angle preferably less than 90° to form a relatively sharp ridge for biting into the tube to be gripped. Conveniently this annular projection is at the position on the internal surface of the collet at or near the point along the length thereof where the collet cam surface reaches its maximum diameter. This position will for convenience in the following description be called the neutral point. If the projection was positioned further along the arms away from the fulcrums thereof the force applied to the tube will be less than if the projection is at the neutral point but the inward deflection of the gripping means will be greater for a given relative movement of the cam surfaces. If on the other hand the gripping means are positioned between the neutral point and the fulcrum of the arms, then for a given relative movement of the cam surfaces, a greater force will be exerted on the tube but the movement of the gripping means will be less. It will be readily apparent therefore that the position of the gripping means will be chosen in accordance with the required pressures and movements which will be determined by the hardness and resistance to compression of the material of the tube to be retained in the tube coupling. It will be seen therefore that this form of coupling permits the designer to have much greater freedom, than has been possible with prior types of coupling, to construct the coupling to meet specific requirements.

The use of a plastics material for the collet leads to a further advantage in that the beak or beaks for gripping the tube may be formed of metal inserts in the plastics material. Thus, in a preferred construction using a collet of plastics material, each arm of the collet incorporates at least one metal element, a portion of which is proud of the internal surface of the plastics material, to form said inwardly-extending projection or projections for engaging the tube. These metal elements improve the grip on the tube and can bite into the surface of the tube, the depth of penetration however being limited by the extent to which the metal elements protrude from the surface of the plastics material forming the arms of the collet. This arrangement thus still further improves the grip that can be obtained on the tube.

The collet with the metal inserts may be made by moulding plastics material to the required shape and subsequently putting in the required inserts and securing them in position for example by ultrasonic or high frequency welding. More conveniently however the insert may be positioned in a mould and the plastics material moulded around the inserts to form the complete collet. When using this technique, it is convenient to form all the inserts as a single metal element, the metal element subsequently being cropped between the arms of the collet so that separate segments thereof are embedded in each arm.

It is preferred to form the collet with the arms shaped so that the internal diameter of the collet decreases along the length of the arms from the root thereof to the position of the inserts. The diameter of the collet at the root end would be made so that it will just receive the tube to be inserted in the coupling. It will of course be understood that couplings of this nature have to be made in the appropriate sizes to accommodate various tube sizes. In putting the tube into the collet therefore the arms will have to be forced outwardly. This results in the resilience of the arms forcing the gripping portion thereof inwardly so that the metal inserts tend to be forced into the tube. A more particular advantage of this construction however is that, compared with a construction in which the internal diameter of the collet is uniform, for a given external size of the collet, smaller slots can be provided between the arms as less reduction in diameter is required in order to pass the collet into the body of the housing on assembly of the coupling. Such smaller slots are advantageous also because they prevent the O-ring seal, which is commonly provided between the inner end of the collet and the tube body, from being forced into the slots under transient pressures.

It will be understood that, in a tube coupling as described above, the aforementioned body member may be part of equipment to which the tube is to be coupled or it may be a member having two or more collets for coupling two or more tubes together, such tubes may be of the same or different sizes.

In general the body member, inwardly of the collet, would have a shoulder and an O-ring seal would be inserted between the inner end of the collet and this shoulder. The tube would be inserted through the collet and through this seal. Conveniently therefore the body member has, inwardly of this seal, a portion with a diameter sufficient to receive the tube, this portion terminating in a further shoulder against which the end of the tube can abut.

DESCRIPTION OF THE PREFERRED EMBODIMENTS

Figure 1:
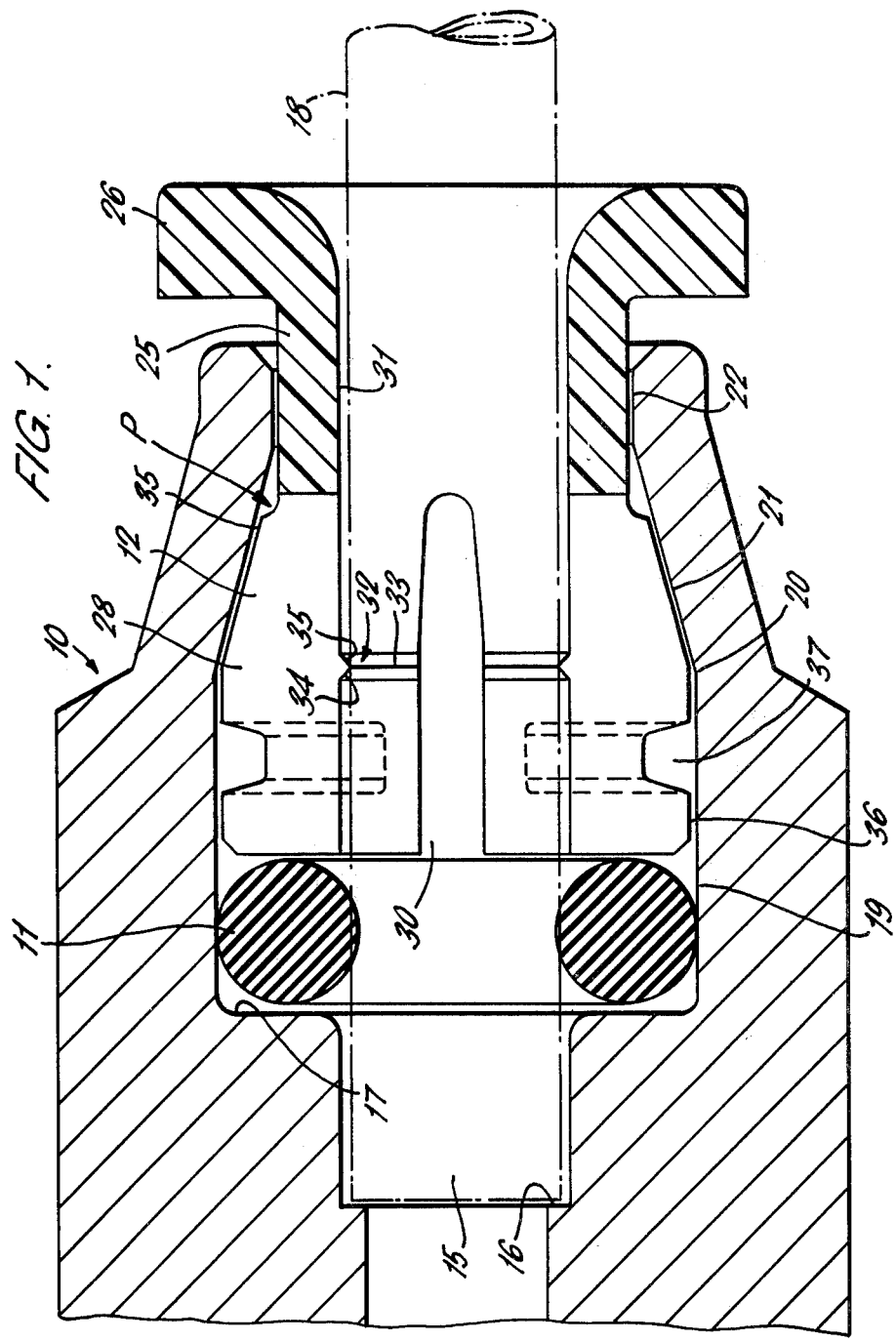
FIG. 1 shows part of a tube coupling device in longitudinal section constituting one embodiment of the invention.

The tube coupling device shown in FIG. 1 of the drawings comprises a body portion 10, only part of which is shown, an O-ring seal 11 and a collet 12. The body portion 10 conveniently is made of metal of other relatively hard material and has a bore 15 with first and second shoulders 16 and 17. The O-ring seal 11 fits in the bore against the shoulder 17. A tube to be gripped, indicated by chain lines 18, can be inserted so that its end abuts against the shoulder 16. From the shoulder 17 towards the open end of the bore, the internal surface of the body portion defining the bore is formed as a cylindrical portion 19 extending as far as a position 20 along the bore and thence, towards the open end of the bore, the inner surface of the body portion tapers inwardly as shown at 21. In this particular embodiment, the bore is terminated in a short cylindrical portion 22.

The collet 12 comprises an annular portion 25 which fits within the cylindrical portion 22 of the bore which, outside the bore, has a flange 26. Inwardly of this annular portion 25 are four arms 28 each of which, in transverse cross-section, is of generally arcuate form and extends over an arc of less than 90° so as to leave gaps such as the gaps 30 between these arms. In this particular embodiment, the collet is formed of an acetal moulding and, in the unstressed position as shown in the drawing, the inner surface 31 of the collet is substantially cylindrical apart from an inwardly-extending rib or projection 32 around the internal periphery of the collet. This projection 32 is for the purpose of gripping the tube when the collet arms are pressed inwardly and has a relatively sharp gripping edge 33 defined by surfaces 34 at an angle of less than 90° to the line of the bore.

The outer surfaces of the collet arms 28 are defined by a tapered portion 35 and a generally cylindrical portion 36. The tapered portion 35 has a taper angle corresponding substantially to the taper angle of the surface 21 of the body portion and extends from the root of the arms 28 indicated by the point P to a position, intermediate the ends of the arms where the maximum diameter of the arms is reached. The remaining part of the arms beyond the tapered portion 35 is of cylindrical section although, in this particular embodiment, grooves 37 of trapezoidal section are formed part of the way around the collet member intermediate the ends of the cylindrical portion 36. These grooves not only reduce the amount of material required for the moulding but also improve the sealing of the tube in the coupling. In this particular embodiment the inwardly-extending projection 32 is formed at a point along the length of the collet arms, referred to hereinafter as the neutral point, where the tapered portion 35 reaches its maximum diameter. The length of the collet is such that the inner end thereof can be pressed against the O-ring seal 11 with the flange 26 clear of the end 22 of the body portion.

To use this coupler, the end of the tube 18 is passed through the collet 12 to abut against the aforementioned shoulder 16 in the body portion 10. The collet diameter is such that the aforementioned projection 32, referred to hereinafter as the beak, resiliently grips the tube 18 when it is forced through in this way, with a light gripping force such that it is possible to move the tube inwardly into the collet. If the tube is now pulled outwardly, because of this grip, the collet is pulled with the tube and the tapered surfaces 35, 21 on the collet and the body member are brought into contact and the collet arms 28 are forced inwardly so that the beak 32 is caused to grip the tube. The arms bend about their fulcrum points P and, if the outward pull on the tube is sufficiently great, the cam surfaces 35, 21 will compress the tube 18 so reducing it in diameter at this point. If the tube were sufficiently flexible and if the collet did not extend inwardly of the body beyond the beak, the reduction in diameter of the tube 18 might be sufficient to enable the collet arms 28 to move so far inwardly that the collet can be withdrawn from the body portion. However, this is prevented by the extension of the collet arms beyond the beak 32 axially inwardly of the body portion so that these inner parts of the arms 28 will also bear against the tube surface. The inward force on the tube is thus spread over an area of the tube surface although the beak continues to grip the tube firmly. The resistance to withdrawal of the tube can thus be increased substantially without excessive compression of the tube, compared with an arrangement in which collet arms do not extend along the bore inwardly of the beak. This inward extension of the collet arms prevents the collet from being withdrawn even when a very strong outward pull is applied to a tube in the coupler.

If the tube is carrying a pressure fluid, it is immaterial that the end of the tube is not tightly against the shoulder 16 or the O-ring 11 is not tightly against the shoulder 17. Any leakage of fluid around the end of the tube will press the O-ring 11 tightly against the outer wall of the cylindrical portion 19 of the body and against the end surface of the collet. The O-ring is compressed in the axial direction and will tend to expand in a radial direction so forming a tight seal between the outer surface of the tube and the internal surface of the body portion of the coupler. If it is required to release the tube from the coupler, the collet is held inwardly towards the O-ring 11, the aforementioned flange 26 facilitating this; the collet arms 28 then remain at their radially outermost position and the tube can be pulled out.

It will be understood that such a coupling member may be used for connecting the tube to some other apparatus or component of which the body forms part or the body portion may have a second collet for gripping a second tube to enable two tubes to be coupled together.

Commonly it would be convenient to form the beak at the neutral point of the collet arms. This is not essential however. If the beak is put further along these arms away from their fulcrum, the action of the tapered surfaces will be to apply a smaller force through a greater movement than if the beak is at the fulcrum point. Conversely, if the beak is put nearer the fulcrum point of the arms, a greater gripping force is imparted with a smaller movement of the beak. The position of the beak along the length of the collet therefore may be chosen in designing the collet in accordance with the resistance to compression and hardness of the tube material for a particular tube to be retained in the coupler. It will be noted that, between the beak and the inner end of the collet arms, that is the end remote from the fulcrum points, these arms will bear against the tube surface and hence will remain substantially parallel to the tube axis. There is therefore no excessive angular movement of the collet arms in the region of the beak. The beak therefore cannot penetrate excessively into the surface of the tube even although very high compression forces might be obtained by a pull on the tube. This type of collet therefore enables the tube to be held against very high pull-out forces. There is no need however to employ any positive step between the tapered surface and the outer end of the body portion of the bore. This form of coupler utilises the strength of a length of the tube in resisting pull-out even although for the necessary initial resilient grip, only the beak need hold the tube.

Figure 2:
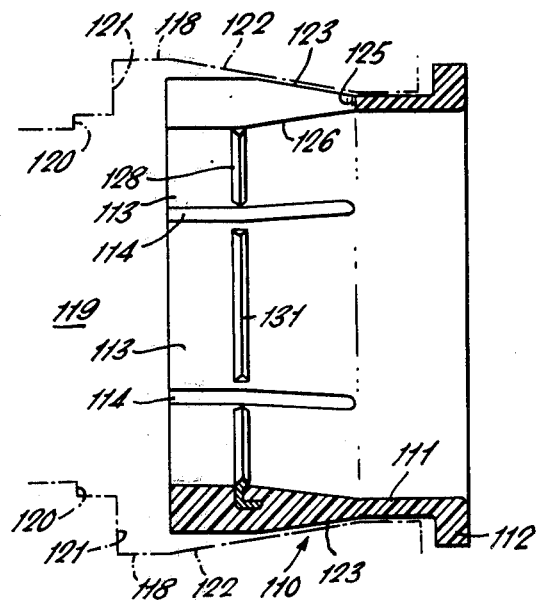
FIG. 2 is a view in side elevation of a collet for a modification of the coupling of FIG. 1.
Figure 3:
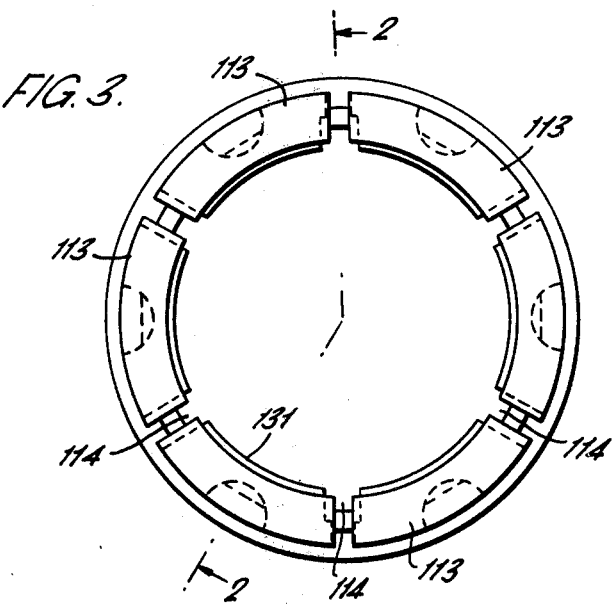
FIG. 3 is an end elevation of the collet of FIG. 2.
Figure 4:
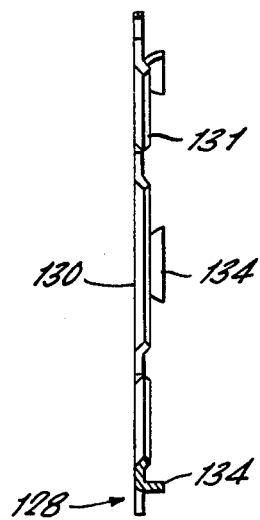
FIG. 4 is a sectional elevation of a metal element which is put in the mould before the collet is moulded this elevation being a section along the line 4—4 of FIG. 5.

Another embodiment of the invention is illustrated in FIGS. 2 to 5. Referring to FIGS. 2 and 3, the collet has a body portion 110 of moulded plastics material comprising a generally cylindrical portion 111 with an outwardly-extending flange 112 at one end and, at the other end, six arms 113 separated by slots 114. The collet, in use, is assembled inside an outer body portion shown in chain lines at 118 (FIG. 2) and made of metal or other relatively hard material. This body portion has a bore 119 with first and second shoulders 120, 121 and an internal tapered surface 122 which engages a surface 123 of the collet arms. This collet is assembled in a body portion which may be similar to that of FIG. 1 so as to form a tube coupler which operates as described with reference to FIG. 1. FIGS. 2 to 4 illustrate certain improvements in the construction of the collet. As will be seen from FIG. 2, the arms of the collet from their root 125, have a surface 126 which slopes inwardly along a part of the length of these arms extending to the position of the metal inserts 128. The internal diameter of the cylindrical portion 111 of the collet is made such that the tube to be fitted in the coupling will just pass through this portion and hence the arms have to be forced outwardly when the tube passes completely into the collet. It is thus possible to obtain an adequate thickness of the collet arms with only a small deformation being needed in order to put the collet into the body of the housing. Thus the width of the slots 114 is much less than if the collet were of uniform internal diameter. This construction also causes the collet resiliently to grip the tube thus still further improving the grip on the tube quite apart from the camming action obtained by the co-operating sloping surfaces on the collet arms and the body.

Figure 5:
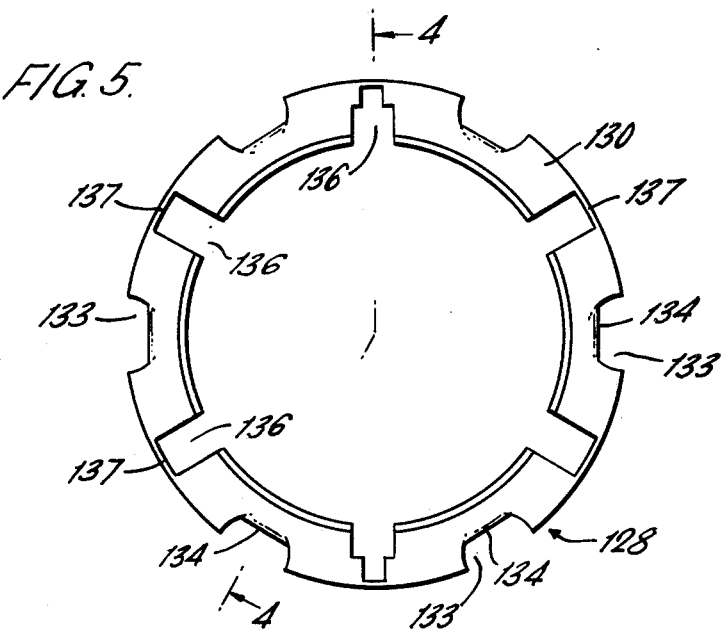
FIG. 5 is an end elevation of the element of FIG. 4.

The metal insert is shown in FIGS. 4 and 5; this insert which is moulded into the collet is an annular element 130, the inner periphery of which is turned up as indicated at 131 to form a beak for biting into the tube inserted in the collet. A plurality of partial cut-outs 133 are made with the resulting tab portions bent over to form keys 134 for ensuring that the metal element 128 is tightly secured in the plastics material which is moulded around the metal element. Where the slots 114 between the arms 113 are to be formed, the metal element 128 is further cut away as shown at 136 to leave narrow holding portions 137 which retain the six arcuate segments of the element in one piece to facilitate handling before insertion in the mould. After the collet has been moulded, it is cropped between the arms so that these portions 137 are cut away. It would be possible to pre-crop the inserts or to form separate segments which would then have to be located individually in the mould. As another way of manufacturing the assembly, the insert could be put in the mould in the form of a complete ring as shown in FIGS. 4 and 5 with the mould shaped so that this ring is cropped as the mould is closed.

I claim:

1. A tube coupling for gripping a tube comprising a body member with a bore, said bore having an internal surface tapering to a narrower diameter in a direction towards an open end of the bore in said body member, a collet in said bore having a circumferentially continuous annular portion and resilient arms extending from said annular portion inwardly in the axial direction from the open end of the bore, said collet having external cam surfaces on said arms arranged to co-operate with said internal surface of said body member, said cam surfaces on the collet arms extending only part of the way along the length of the arms from the root end thereof where the arms join together such that the tapered internal surface on the body member engages only a part of the length of said arms adjacent the root end thereof so that the collet arms are forced radially inwardly by flexure about the root end when the collet is moved axially towards the open end of the bore, the collet arms furthermore have an inwardly extending projection at a position along the length of each arm intermediate the ends thereof for engaging and gripping a tube in the collet, radially inwardly facing surfaces on the arms extending beyond the projection inwardly of the bore and being adapted to bear against the tube when the arms are forced inwardly to spread the gripping force along a large surface area of the tube.

2. A tube coupling as claimed in claim 1 wherein the spacing between the arms are such that, in the absence of any tube within the collet, the collet can be withdrawn through the aforesaid open end of the bore.

3. A tube coupling as claimed in claim 1 wherein the arms of the collet, beyond said projection, are of substantially uniform thickness in the radial direction.

4. A tube coupling as claimed in claim 1 wherein the radially inner and the radially outer surfaces of the arms of the collet, beyond said projection, are on substantially cylindrical surfaces when the arms are unstressed.

5. A tube coupling as claimed in claim 1 wherein said inwardly extending projection comprises an annular rib extending around the periphery of the collet on the internal surface thereof.

6. A tube coupling as claimed in claim 5 wherein the side surfaces of said rib meet at an angle less than 90° to form a ridge for biting into the tube to be gripped.

7. A tube coupling as claimed in claim 5 wherein the annular projection is at the position on the internal surface of the collet at or near the point along the length thereof where the collet cam surface reaches its maximum diameter.

8. A tube coupling as claimed in claim 1 wherein the collet is of plastics material.

9. A tube coupling as claimed in claim 8 wherein each arm of the collet incorporates at least one metal element, a portion of which is proud of the internal surface of the plastics material, to form said inwardly-extending projection for engaging the tube.

10. A tube coupling as claimed in claim 9 wherein the internal diameter of the collet decreases along the length of the arms thereof from the root end to the position of the metal element.

11. A tube coupling as claimed in claim 9 and having the metal element secured in plastics material moulded to the required shape.

12. A tube coupling as claimed in claim 9 and having the plastics material moulded around the metal element to form the complete collet.

13. A tube coupling comprising a tube and a body member wherein said body member has a bore with an internal surface tapering to a narrower diameter in a direction towards an open end of the bore in said body member, a moulded plastics collet in said bore with a circumferentially continuous annular portion and with resilient arms extending from said annular portion inwardly in the axial direction from the open end of the bore, said arms having external cam surfaces arranged to co-operate with said internal surface, said cam surfaces on the collet arms extending only part of the way along the length of the arms from the root end thereof where the arms join together, so that the collet arms are forced radially inwardly by flexure about the root end when the collet is moved axially towards the open end of the bore, the tube being located axially within the collet and the collet arms furthermore each having a radially inwardly extending projection for gripping the tube when the collet arms are forced radially inwardly, which projections are located on their respective collet arms intermediate the ends thereof, the radially inwardly-facing surfaces of the arms beyond said projections being arranged to bear against the tube surface when the collet arms are forced inwardly to spread the gripping force along a large surface area of the tube.

14. A tube coupling as claimed in claim 13 wherein said collet includes metal inserts for forming said projections.

15. A tube coupling as claimed in claim 13 wherein said cam surfaces extend along the length of the collet arms between the projections and said annular portion of the collet.

* * * * *